UNITED STATES PATENT OFFICE.

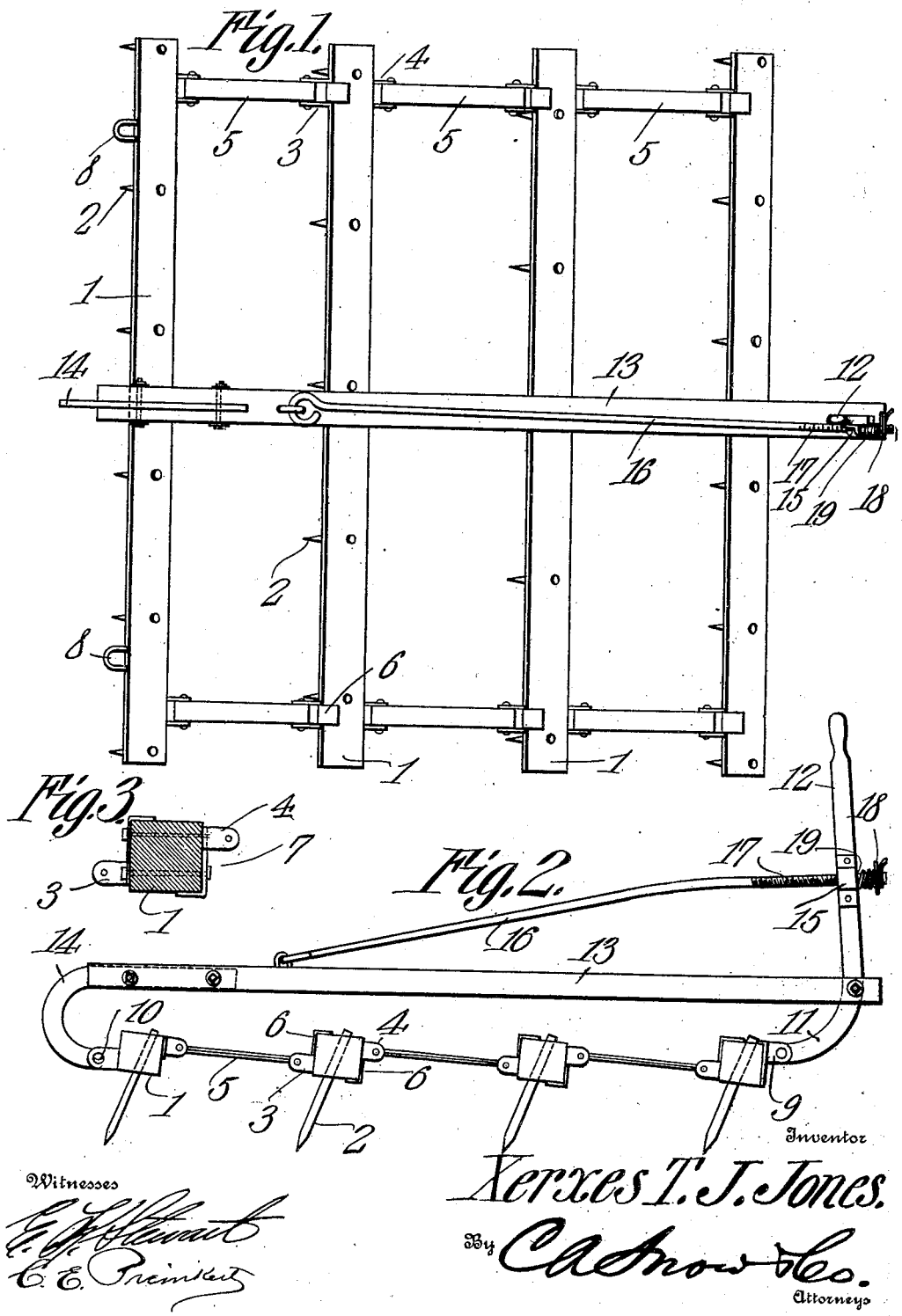

XERXES T. J. JONES, OF MORRILLTON, ARKANSAS.

HARROW.

No. 920,474. Specification of Letters Patent. Patented May 4, 1909.

Application filed September 11, 1908. Serial No. 452,597.

*To all whom it may concern:*

Be it known that I, XERXES T. J. JONES, a citizen of the United States, residing at Morrillton, in the county of Conway and State of Arkansas, have invented a new and useful Harrow, of which the following is a specification.

This invention has relation to harrows, and it consists in the novel construction and arrangement of its parts, as hereinafter shown and described.

The object of the invention is to provide a harrow with a series of beams, each of which carries a gang of teeth, the said beams being pivotally connected together, and in providing means whereby the said beams are subjected to spring tension, and will have a tendency to rock or turn upon their longitudinal axes as the teeth carried thereby pass along the surface of the soil. Such movement on the part of the beams and the teeth will have the effect of keeping the teeth free of trash, and at the same time the teeth will more effectually scatter and pulverize the soil. As all of the beams of the harrow are pivotally connected together, it will be seen that they may be subjected individually to the tension of a single spring; that is to say, but one spring is necessary in the structure to subject all of the beams to tension.

A further object of the invention is to provide means for connecting the beams together whereby they may not move longitudinally with relation to each other, and thus the teeth carried by the several beams are maintained in their proper relative relations and cannot track one with another.

In the accompanying drawings:—Figure 1 is a top plan view of the harrow. Fig. 2 is a side elevation of the same, and Fig. 3 is a transverse sectional view through one of the beams of the harrow.

The harrow consists of the beams 1, which are arranged parallel to each other. Each beam carries a series of harrow teeth 2, the lower end portions of which are forwardly disposed with relation to the beams; that is to say, the said teeth are downwardly inclined at their pointed ends at an acute angle with relation to the surface of the soil. The beams 1 are preferably rectangular in transverse sections, although they may be of other configuration. The lugs 3 are mounted at the lower forward sides of all the beams 1 except the front beam, and the lugs 4 are mounted at the upper rear side of all the said beams except the rear beam. The metallic strap links 5 are pivotally connected at their forward ends with the lugs 4, and at their rear ends with the lugs 3, thus establishing pivotal connection between the individual members of the entire series of beams.

The lugs 3 and 4 are mounted upon the plates 6, which are secured to the forward and rear sides of the beams 1 by means of transverse bolts 7, in the manner illustrated in Fig. 3 of the drawings. The forward and rear beams of the series of beams are provided with draft eyes 8, to which suitable draft appliances may be attached. A lug 9 is mounted upon the upper rear side of the rear beam 1, and a lug 10 is mounted upon the lower forward side of the forward beam 1. A lever 12 is provided with a lower forwardly curved end portion 11, which is pivotally connected with the lug 9 mounted upon the rear beam 1 of the series of beams. The said lever 12 is fulcrumed in the bar 13 which extends transversely over the beams 1, and which is provided at its forward end with a crook member 14 which is attached at its lower end by means of a pivot with the lug 10 mounted upon the forward beam 1 of the series of beams. The guide 15 is mounted upon the upper portion of the lever 12. The rod 16 is attached to the forward portion of the bar 13, and the rear end portion of the said rod 16 passes through the guide 15 carried by the lever 12. The rear end portion of the rod 16 is threaded as at 17 and a nut 18 engages the said thread and is located behind the lever 12. The coiled spring 19 surrounds the rod 16 and is interposed between the nut 18 and the rear edge of the lever 12, or the guide 15 carried thereby.

From the above description it is obvious that as the harrow is drawn along the soil and the pointed ends of the teeth 2 have contact with the same, the stress to which the teeth are subjected will have a tendency to turn the beams 1 upon axes approximating their centers, and that the lugs 3 and 4 will be swung in opposite directions, the lugs 3 having a tendency to move downwardly and rearwardly, while the lugs 4 have a tendency to move forwardly and upwardly. The lug 9 will have a tendency to move in the same direction as the lugs 4, while the lug 8 will have a tendency to move in the same direction as the lugs 3. Through the connecting links 5 the beams 1 will, in a measure, be held against relative movement upon their axes as above described, although they are not positively fixed, as when one beam makes a partial rotation a corresponding movement in the opposite direction may be made by the next adjacent beam. Thus the beams are flexibly connected together, and the implement as an entirety possesses a certain amount of flexion. By reason of the fact that the lower end portion 11 of the lever 12 is pivotally connected with the lug 9 as the said lug 9 has a tendency to move as above described it in turn will swing the lever 12 upon its fulcrum with relation to the bar 13 which will force the upper portion of the said lever back against the tension of the spring 19. Thus it will be seen that all of the beams throughout the series of beams are subjected to the tension of the said spring 19, and that by adjusting the nut 18 upon the rod 16 that the tension of the said spring 19 may be increased or diminished as desired. It will also be seen that inasmuch as the said beams 1 are connected together by the metallic links 5 which are pivoted at their ends to the lugs 3 and 4 respectively of the beams, the said beams are held against relative longitudinal movement, and consequently the teeth carried by the said beams always maintain the same relative position in the line of draft of the implement and cannot move laterally with relation to the said line and track one with another. It will also be seen that by disconnecting the crook member 14 from the lug 10 and the lower end of the lever 12 from the lug 9, the beams 1 may be rolled up so that the pointed ends of the teeth 2 will occupy space between the said beams, and the bar 13 may be positioned substantially parallel with relation to the said beams and rolled up therewith at the same time.

Thus the implement may be transformed into a compact assemblage of parts for storage or other purposes, and inasmuch as the pointed ends of the said teeth lie between the said beams they are not exposed and consequently are not liable to damage or injure live-stock or other objects that may come in contact with the implement.

Having described my invention, what I claim as new, and desire to secure by Letters Patent, is:—

1. A harrow comprising a series of beams, each carrying teeth, links pivotally connected at their forward ends to the upper portions of forward beams, and at their rear ends, to the lower portions of rear beams, a bar disposed transversely with relation to the beams, and being pivotally connected at its forward end with one of the beams, a lever fulcrumed to the bar and pivotally connected at its lower end to the rear beam, a guide carried by the lever, a rod attached to the bar and passing through said guide, and a means for adjusting the rod longitudinally in the guide of the lever.

2. A harrow comprising a series of beams each carrying teeth, links pivotally connected at their forward ends to the upper portions of forward beams and at their rear ends to the lower portions of rear beams, a bar disposed transversely with relation to the beams and being pivotally connected at its forward end with one of the beams, a lever fulcrumed to the bar and being pivotally connected at its lower end to the rear beam, a guide carried by the lever, a rod attached to the bar and passing through said guide, and a spring mounted upon the rod and bearing against the upper portion of the lever.

3. A harrow comprising a series of beams, teeth carried by the beams, and being forwardly and downwardly inclined at their lower end portions, links pivotally connected at their forward ends to the upper rear portions of the beams, and at their rear ends to the lower forward portions of the beams, a bar transversely disposed with relation to the beams and being pivotally connected at its forward end with the forward beam, a lever fulcrumed to the bar and being pivotally connected at its lower end with the rear beam, a guide carried by the lever, a rod attached to the bar and passing through the guide and a spring mounted upon the rod and bearing against the upper portion of the lever.

In testimony that I claim the foregoing as my own, I have hereto affixed my signature in the presence of two witnesses.

XERXES T. J. JONES.

Witnesses:
J. W. BEARDEN,
HOMER BEARDEN.